US012651238B2

(12) United States Patent
Bapat et al.

(10) Patent No.: US 12,651,238 B2
(45) Date of Patent: Jun. 9, 2026

(54) MACHINE-LEARNING BASED DELAY PREDICTION

(71) Applicant: Stripe, LLC, South San Francisco, CA (US)

(72) Inventors: Salil Bapat, Bellevue, WA (US); Mark Tokutomi, Reno, NV (US); Sankash Shankar, Brooklyn, NY (US); Ville-Jalmari Koskela, Redmond, WA (US); Sumeet Bedi, Kirkland, WA (US); Eric Kramer, San Francisco, CA (US); Devesh Chourasiya, Mountain View, CA (US); Albert Koy, Sunnyvale, CA (US)

(73) Assignee: Stripe, LLC, South San Francisco, CA (US)

( * ) Notice: Subject to any disclaimer, the term of this patent is extended or adjusted under 35 U.S.C. 154(b) by 13 days.

(21) Appl. No.: 18/540,634

(22) Filed: Dec. 14, 2023

(65) Prior Publication Data
US 2025/0200537 A1     Jun. 19, 2025

(51) Int. Cl.
*G06Q 20/10*     (2012.01)

(52) U.S. Cl.
CPC .................................... *G06Q 20/10* (2013.01)

(58) Field of Classification Search
CPC ...................................................... G06Q 20/10
USPC ........................................................... 705/39
See application file for complete search history.

(56) References Cited

U.S. PATENT DOCUMENTS

| | | | |
|---|---|---|---|
| 5,224,162 A | 6/1993 | Okamoto | |
| 6,014,645 A | 1/2000 | Cunningham | |
| 6,085,174 A | 7/2000 | Edelman | |
| 7,047,404 B1 | 5/2006 | Doonan | |
| 7,155,407 B2 | 12/2006 | Boswer | |
| 8,014,762 B2 | 9/2011 | Chmaytelli | |
| 8,645,213 B2 | 2/2014 | Granbery | |
| 9,735,965 B1 | 8/2017 | Shavell | |

(Continued)

OTHER PUBLICATIONS

Du, "Financial Decision Support System Research Based on Data Warehouse," 2009 International Conference on Information Management, Innovation Management and Industrial Engineering, 2009, pp. 23-26.

(Continued)

*Primary Examiner* — Hai Tran
(74) *Attorney, Agent, or Firm* — BAKERHOSTETLER

(57)     ABSTRACT

Aspects of the subject technology include obtaining a transfer request event associated with a transaction, the transfer request event indicating a request day of week and time of day, and, when the request time of day is past a predetermined cutoff time, adjusting the request day of week to be a subsequent day. Aspects also include determining, using the transfer request event and based on a machine learning model trained on historical transaction data, a predicted transfer delay for the transaction, obtaining a set of relevant non-transfer days based on a comparison between the historical transaction data and a set of past non-transfer days, and, when one or more non-transfer days from the set of relevant non-transfer days occur within a time period from the request day of week and over the predicted transfer delay, adjusting the predicted transfer delay based on the one or more non-transfer days.

20 Claims, 7 Drawing Sheets

(56) References Cited

U.S. PATENT DOCUMENTS

| | | |
|---|---|---|
| 10,460,298 B1 | 10/2019 | Ran |
| 11,182,752 B2 | 11/2021 | Powell |
| 11,385,771 B2 | 7/2022 | Chan |
| 11,393,043 B2 | 7/2022 | Bhavsar |
| 11,669,866 B2 | 6/2023 | Heiser, II |
| 11,741,075 B2 | 8/2023 | Yang |
| 2001/0037276 A1 | 11/2001 | Kelly |
| 2002/0026411 A1 | 2/2002 | Nathans |
| 2002/0069077 A1 | 6/2002 | Brophy |
| 2002/0145035 A1 | 10/2002 | Jones |
| 2003/0158960 A1 | 8/2003 | Engberg |
| 2003/0233326 A1 | 12/2003 | Manley |
| 2004/0098323 A1 | 5/2004 | Bowser |
| 2006/0065717 A1 | 3/2006 | Hurwitz |
| 2006/0143231 A1 | 6/2006 | Boccasam |
| 2006/0174352 A1 | 8/2006 | Thibadeau |
| 2006/0293989 A1 | 12/2006 | Morrison |
| 2007/0100748 A1 | 5/2007 | Dheer |
| 2007/0244816 A1 | 10/2007 | Patni |
| 2008/0071625 A1 | 3/2008 | Arumugam |
| 2009/0083181 A1 | 3/2009 | Bishop |
| 2009/0132813 A1 | 5/2009 | Schibuk |
| 2009/0234660 A1 | 9/2009 | Berneman |
| 2010/0070308 A1 | 3/2010 | Long, Sr. |
| 2011/0153481 A1 | 6/2011 | Hamby |
| 2011/0231272 A1 | 9/2011 | Englund |
| 2012/0150714 A1 | 6/2012 | Agbor |
| 2012/0191579 A1 | 7/2012 | Ahn |
| 2012/0260322 A1 | 10/2012 | Logan |
| 2013/0103576 A1 | 4/2013 | Ackley |
| 2013/0144731 A1 | 6/2013 | Baldwin |
| 2013/0238489 A1 | 9/2013 | Bouey |
| 2013/0238490 A1 | 9/2013 | Bouey |
| 2013/0268440 A1 | 10/2013 | Tierney |
| 2013/0332324 A1 | 12/2013 | Mischell et al. |
| 2014/0129432 A1 | 5/2014 | Hanson |
| 2014/0270172 A1 | 9/2014 | Peirce |
| 2014/0316983 A1 | 10/2014 | Block |
| 2015/0154570 A1 | 6/2015 | Dheer |
| 2016/0292788 A1 | 10/2016 | Grasso |
| 2016/0321625 A1 | 11/2016 | Gilliam, III |
| 2018/0068389 A1 | 3/2018 | Pessin |
| 2018/0096329 A1 | 4/2018 | Hamilton |
| 2018/0130131 A1 | 5/2018 | Simonoff |
| 2018/0158116 A1 | 6/2018 | Hoang |
| 2018/0204297 A1 | 7/2018 | Cook |
| 2018/0225791 A1 | 8/2018 | Cook |
| 2018/0330342 A1 | 11/2018 | Prakash |
| 2019/0180351 A1 | 6/2019 | Seebaugh |
| 2019/0266607 A1* | 8/2019 | Mori ..................... G06N 5/046 |
| 2019/0378100 A1 | 12/2019 | Muthu |
| 2019/0378132 A1 | 12/2019 | Gilliam, III |
| 2020/0051170 A1 | 2/2020 | Lutnick |
| 2020/0151726 A1* | 5/2020 | Song .................. G06Q 20/4014 |
| 2020/0167822 A1 | 5/2020 | Cook |
| 2020/0226687 A1 | 7/2020 | Krishna |
| 2021/0118074 A1 | 4/2021 | Liu |
| 2021/0224759 A1 | 7/2021 | Zorzano |
| 2021/0382870 A1 | 12/2021 | Yang |
| 2021/0389853 A1 | 12/2021 | Chan |
| 2022/0044315 A1 | 2/2022 | Kothapalli |
| 2022/0188917 A1 | 6/2022 | Petersen |
| 2022/0398646 A1 | 12/2022 | Saunders |
| 2023/0020878 A1 | 1/2023 | Bowie |
| 2023/0021606 A1 | 1/2023 | Zhang et al. |
| 2023/0214832 A1 | 7/2023 | Hu |
| 2024/0330864 A1 | 10/2024 | Hoffman |
| 2025/0045831 A1 | 2/2025 | Venkataraman |

OTHER PUBLICATIONS

Li et al., "How people select their payment methods in online auctions? An early exploration of eBay transactions," 37th Annual Hawaii International Conference on System Sciences, 2004, 10 pages.

International Search Report and Written Opinion from International Patent Application No. PCT/US24/60207, dated Apr. 11, 2025, 19 pages.

Anderson et al., "Insider attack and real-time data mining of user behavior," IBM Journal of Research and Development, May 2007, vol. 41, No. 3.4, pp. 465-475.

* cited by examiner

100

104

FINANCIAL
INSTITUTION
SERVER

102

106

NETWORK

110

FINANCIAL
SERVICE
PROVIDER
SERVER

108

PAYMENT
NETWORK
SERVER

| ID | MON | TUE | WED | THU |
|----|-----|-----|-----|-----|
| A  |     | X   |     | O   |
| B  | X   |     | O   |     |
| C  | X   | O   |     |     |

X: CPD
O: expected settlement date

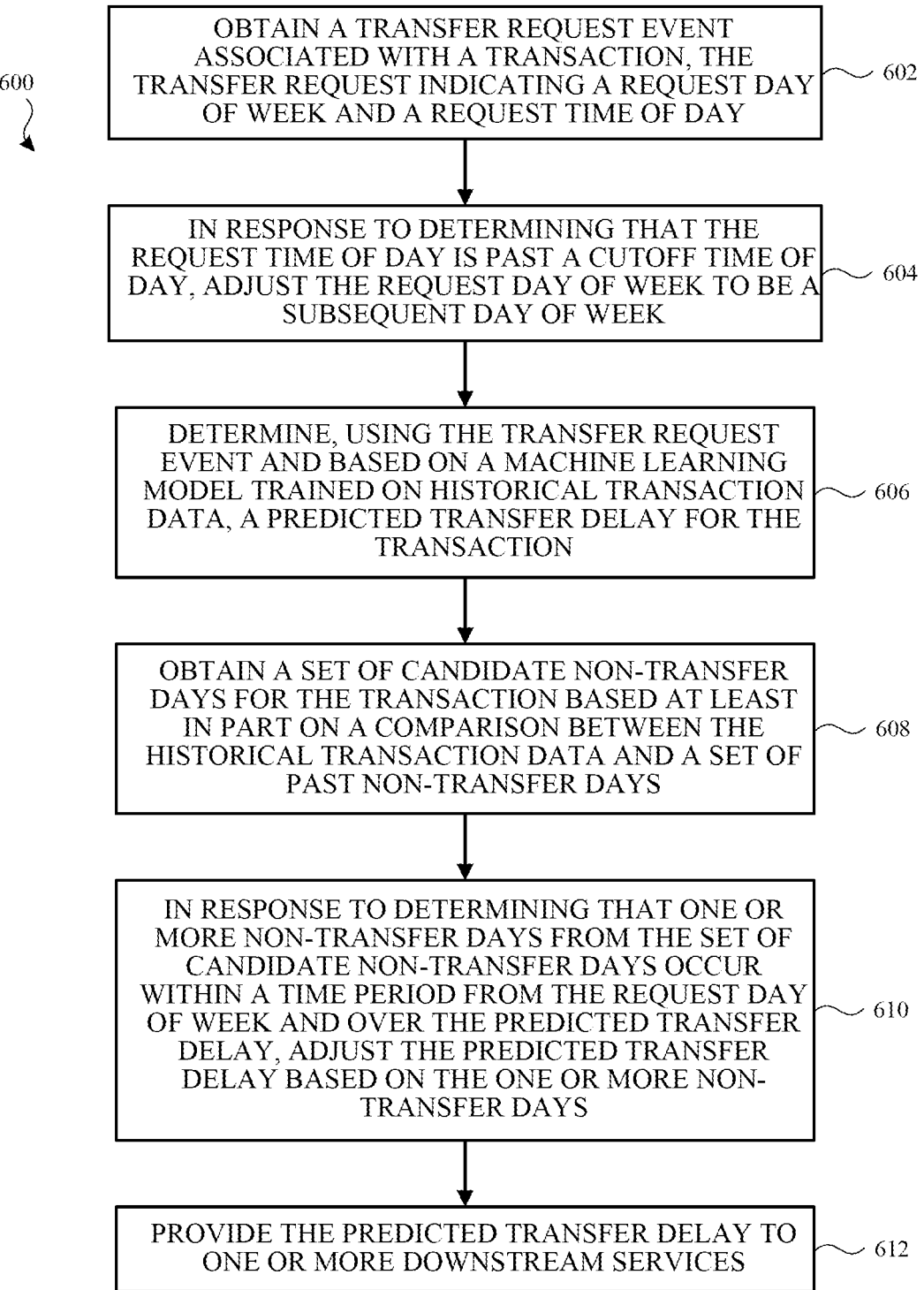

600

OBTAIN A TRANSFER REQUEST EVENT ASSOCIATED WITH A TRANSACTION, THE TRANSFER REQUEST INDICATING A REQUEST DAY OF WEEK AND A REQUEST TIME OF DAY ⎯ 602

IN RESPONSE TO DETERMINING THAT THE REQUEST TIME OF DAY IS PAST A CUTOFF TIME OF DAY, ADJUST THE REQUEST DAY OF WEEK TO BE A SUBSEQUENT DAY OF WEEK ⎯ 604

DETERMINE, USING THE TRANSFER REQUEST EVENT AND BASED ON A MACHINE LEARNING MODEL TRAINED ON HISTORICAL TRANSACTION DATA, A PREDICTED TRANSFER DELAY FOR THE TRANSACTION ⎯ 606

OBTAIN A SET OF CANDIDATE NON-TRANSFER DAYS FOR THE TRANSACTION BASED AT LEAST IN PART ON A COMPARISON BETWEEN THE HISTORICAL TRANSACTION DATA AND A SET OF PAST NON-TRANSFER DAYS ⎯ 608

IN RESPONSE TO DETERMINING THAT ONE OR MORE NON-TRANSFER DAYS FROM THE SET OF CANDIDATE NON-TRANSFER DAYS OCCUR WITHIN A TIME PERIOD FROM THE REQUEST DAY OF WEEK AND OVER THE PREDICTED TRANSFER DELAY, ADJUST THE PREDICTED TRANSFER DELAY BASED ON THE ONE OR MORE NON-TRANSFER DAYS ⎯ 610

PROVIDE THE PREDICTED TRANSFER DELAY TO ONE OR MORE DOWNSTREAM SERVICES ⎯ 612

*FIG. 6*

MACHINE-LEARNING BASED DELAY PREDICTION

CROSS-REFERENCE TO RELATED APPLICATIONS

This application is related to U.S. patent application Ser. No. 18/540,619 entitled "DATA AGGREGATION FOR THRESHOLDING-BASED ACCOUNT MANAGE-MENT," U.S. patent application Ser. No. 18/540,626 entitled "DISTRIBUTED ASSETS MANAGEMENT PLATFORM," U.S. patent application Ser. No. 18/540,633 entitled "ASSETS INTERFACE OF A DISTRIBUTED ASSETS MANAGEMENT PLATFORM," U.S. patent application Ser. No. 18/540,630 entitled "HYDRATION SYSTEM IN A DISTRIBUTED ASSETS MANAGEMENT PLATFORM," U.S. patent application Ser. No. 18/540,639 entitled "TOOLS FOR ACCOUNT MANAGEMENT," and U.S. patent application Ser. No. 18/540,638 entitled "EXCHANGE PLATFORM IN A DISTRIBUTED ASSETS MANAGEMENT PLATFORM," which were each filed on Dec. 14, 2023.

TECHNICAL FIELD

The present description generally relates to event fore-casting and, more particularly, to predicting the timing of aspects of transaction events.

BACKGROUND

A payment service provider may be a financial service provider that facilitates payments for businesses and con-sumers. Payment service providers may act as intermediar-ies in the payment process, connecting merchants, consum-ers, card networks, and/or other financial institutions. Payment service providers may provide the infrastructure necessary for the secure processing of transactions, includ-ing the authorization and settlement of payments. An elec-tronic money institution may be another type of financial service provider that is authorized to issue electronic money (e-money), which may be a digital alternative to cash, stored on an electronic device or remotely at a server. Electronic money institutions may offer services similar to traditional banks but operate predominantly in the digital space. Elec-tronic money institutions may provide payment services such as facilitating credit transfers, issuing payment instru-ments, and/or money remittances.

Accordingly, a financial service provider may be a pay-ment service provider and/or an electronic money institution that has one or more entities, which may be a legal entity through which the financial service provider operates. An entity may be associated with one or more other entities representing different jurisdictions of the entity. For example, a financial service provider may be an American company and thus have an American entity but also have a UK entity and an EU entity for facilitating its operations in the UK and EU jurisdictions, respectively.

Financial service providers may facilitate transactions between, for example, a merchant and its customers. A transaction may be any balance-impacting money move-ment, such as a charge or a payout, and may encompass payment services and/or e-money services via fiat currency and/or e-money, such as a credit card transaction. The lifecycle of such a credit card transaction may involve multiple steps, starting with the entry into the clearing process and culminating in the reconciliation of funds.

Initially, when a transaction is made, an event known as a clearing request may be sent by a financial service provider to a card network (e.g., Visa, Mastercard, or American Express), signifying the transaction's entry into the clearing process.

During the clearing process, transactions may be assembled into a batch file, which may then be submitted to the card network for processing. The card network may process these transactions, for instance, by validating, autho-rizing, and/or settling the transactions. After the clearing request is sent, the settlement funds may be received (e.g., in a batch transaction) from the card network. However, there may be varying delays in the receipt of the settlement funds across multiple transactions due to various factors, such as the time of submission, the currency involved, the gateway country, and/or the specific settlement service used by the card network. A financial service provider may implement one or more downstream processes that may rely on the settlement delay being accurately determined across the transactions.

BRIEF DESCRIPTION OF THE DRAWINGS

Certain features of the subject technology are set forth in the appended claims. However, for the purpose of explana-tion, several embodiments of the subject technology are set forth in the following figures.

FIG. 5 depicts a diagram of an example of various non-transfer day types in accordance with one or more embodiments.

FIG. 6 depicts a flow diagram of an example process for predicting transaction completion in accordance with one or more embodiments.

DETAILED DESCRIPTION

Figure 1:
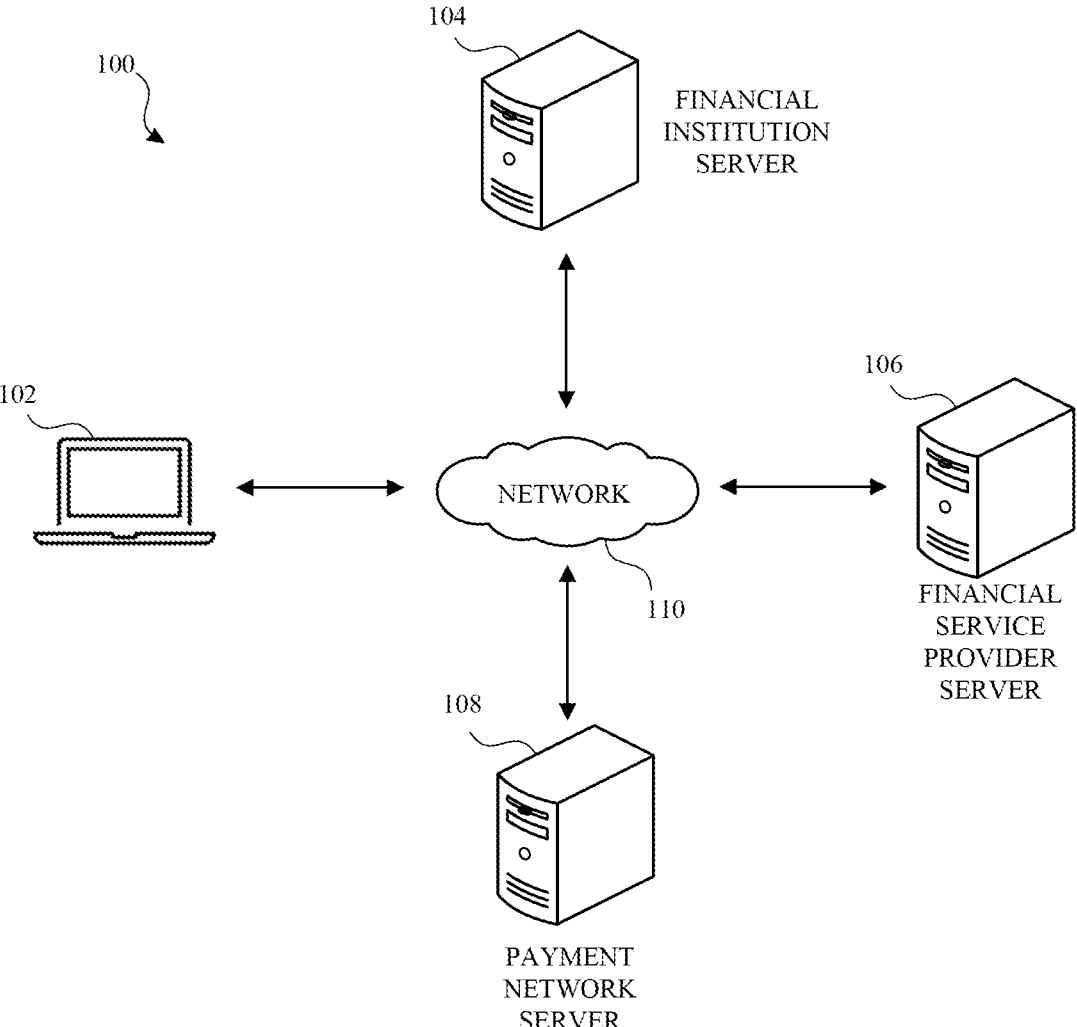
FIG. 1 illustrates an example network environment in which the subject technology may be implemented in accor-dance with one or more embodiments.

The detailed description set forth below is intended as a description of various configurations of the subject technol-ogy and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other embodiments. In one or more embodiments, structures and components are shown in block diagram form in order to avoid obscuring the concepts of the subject technology.

In the course of processing a transaction (e.g., as described above), the settlement delay may vary depending on one or more factors, such as national holidays which may differ from country to country and year to year. These delays may ultimately be reconciled when settlement reports are received; however, an organization's downstream financial processes may need to account for these settlement delays before the settlement reports are received. For example, not being able to properly account for settlement delays before the settlement reports are received may complicate the tracking of cash flow, making it challenging to determine the exact amount of funds received and pending. Additionally, without current settlement information, forecasting and financial planning may become difficult, potentially affecting the financial service provider's ability to make informed business decisions.

An organization's liquidity management may also be impacted by relying on settlement reports for determining settlement delay. For example, financial service providers may rely on expected settlement delays to manage their cash flow effectively. Inaccurate settlement delays can disrupt an organization's ability to allocate funds appropriately, impacting not only operations but also their ability to meet financial obligations, such as paying merchants on time, and/or their ability to comply with regulatory standards (e.g., safeguarding regulations).

To address these and other problems, the subject technology provides a predictive modeling system designed to estimate delays in the settlement of transactions (e.g., credit card transactions) and considers various factors such as non-transfer days (e.g., holidays), which can affect settlement timing and may vary from country to country and year to year. The system may include a machine learning model trained with historical transaction data, including details such as the time of the clearing request, the day of the week of the clearing request, the country, and/or currency involved, as well as the actual delay experienced between the clearing request and the settlement. The subject system may use the machine learning model to predict a settlement, or transfer, delay for a given transaction and may adjust the predicted transfer delay to account for any varying non-transfer days (e.g., holidays) during the predicted settlement period.

In this manner, the subject system may provide highly accurate predicted settlement delays to downstream services. The downstream services may utilize the predicted settlement delays in one or more operations which may be unimpacted when the corresponding settlement reports are received, i.e., given that the settlement delays indicated in the settlement reports will be substantially the same as the predicted settlement delays. In this manner, the subject system reduces the processing, memory, and/or communication resources utilized by the downstream services by reducing or eliminating the need for any additional, e.g., corrective, transactions and/or operations when the settlement reports are received.

FIG. 1 illustrates an example network environment 100 in which the subject technology may be implemented in accordance with one or more embodiments. Not all of the depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The network environment 100 may be an exemplary environment in which the subject system may be implemented and may include, for example, an electronic device 102, a financial institution server 104, a financial service provider server 106, and/or a payment network server 108. The network 110 may communicatively (directly or indirectly) couple one or more of the electronic device 102, the financial institution server 104, the financial service provider server 106, and/or the payment network server 108. In one or more embodiments, the network 110 may be an interconnected network of devices that may include, or may be communicatively coupled to, the Internet.

For explanatory purposes, the network environment 100 is illustrated in FIG. 1 as including the electronic device 102, the financial institution server 104, the financial service provider server 106, and the payment network server 108; however, the network environment 100 may include any number of electronic devices and/or any number of servers communicatively coupled to each other directly or via the network 110. In addition, the various systems of FIG. 1 may be, and/or may include all or part of, the electronic system discussed below with respect to FIG. 7.

The electronic device 102 may be, for example, a wearable device (such as a watch, a band, and the like), a desktop computer, a portable computing device (e.g., a laptop computer), a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, for example, the electronic device 102 is depicted as a laptop computer. The electronic device 102 may be associated with one or more accounts, credentials, or any other identity information registered with the financial service provider server 106 belonging to a user associated with the electronic device 102.

The financial service provider server 106 may include, for example, one or more servers that host or facilitate a service that may be used by one or more parties (e.g., the electronic device 102) and may act as a central hub for processing transactions (e.g., credit card payments). The financial service provider server 106 may store account information (e.g., user account, usernames/handles, or any other account-specific data) associated with the electronic device 102 and/or users thereof and/or users associated therewith. To process a charge, the financial service provider server 106 may communicate with the payment network server 108 to retrieve funds from the bank associated with the payment network server 108, which may include clearing and settlement of funds. To process a payout, the financial service provider server 106 may communicate with the financial institution server 104 to send funds from a user's available balance on the financial service provider server 106 to the user's bank (e.g., the financial institution server 104 and/or another bank). The financial service provider server 106 may be, and/or may include all or part of, the electronic system discussed below with respect to FIG. 7.

The financial institution server 104 may include, for example, one or more servers that manage daily operations of a corresponding financial institution (e.g., a bank), including customer account management, transaction processing for deposits, withdrawals, and/or transfers, as well as interfacing with external networks for ATM and card payment services. The financial institution server 104 may maintain and update account balances, process payment instructions, manage customer data, and/or facilitate secure interactions with the bank's online services. The financial institution server 104 may store account information (e.g., user account, usernames/handles, or any other account-specific data) associated with the electronic device 102 and/or users thereof and/or users associated therewith. The financial institution server 104 may be, and/or may include all or part of, the electronic system discussed below with respect to FIG. 7.

The payment network server 108 may include, for example, one or more servers that facilitate the communication and/or transaction processing between various financial entities such as banks, financial service providers, and/or users (e.g., merchants). The payment network server 108 may be responsible for the secure and efficient transmission of transaction data across the payment network, which may include authorization requests from merchants, confirmation of funds from issuing banks, and the coordination of clearing and settlement processes. The payment network server 108 may store account information (e.g., user account, usernames/handles, or any other account-specific data) associated with the electronic device 102 and/or users thereof and/or users associated therewith. The payment network server 108 may be, and/or may include all or part of, the electronic system discussed below with respect to FIG. 7.

An example server device that may be implemented by one or more of the financial institution server 104, the financial service provider server 106 and/or the payment network server 108 is discussed further below with respect to FIG. 2.

In operation, the financial service provider server 106 may receive transaction data corresponding to transactions that are associated with merchant accounts that are serviced by the financial service provider server 106 and may predict a settlement delay (or transfer delay) for each of the transactions using a transfer completion prediction pipeline. The transfer completion prediction pipeline may utilize one or more machine learning models to predict an initial settlement delay (e.g., based on historical transaction data from which the models are trained), and then may implement one or more heuristics to adjust the settlement delay based on one or more varying non-transfer days (e.g., holidays) that cannot be properly accounted for by the machine learning models to predict a transaction completion date. An example transfer completion prediction pipeline is discussed further below with respect to FIG. 3, and an example process for predicting a transaction completion date is discussed further below with respect to FIG. 6.

The varying non-transfer days may correspond to holidays that are either explicitly determined from, for example, a calendar (or holiday) data feed, or that are implicitly inferred based on historical transaction data. For example, although a particular holiday in a given country may not be indicated in the calendar data feed, historical transaction data for the given country can indicate recurring additional settlement delays between particular dates which may be indicative of an inferred holiday (or an inferred non-transfer day). The identification of varying inferred non-transfer days is discussed further below with respect to FIG. 4. The subject system also takes into account when an inferred non-transfer day falls within the predicted settlement period, as is discussed further below with respect to FIG. 5. Accordingly, the subject system can perform accurate predictions of transaction completion dates without being dependent on the accuracy of any particular calendar data feed provider.

Figure 2:
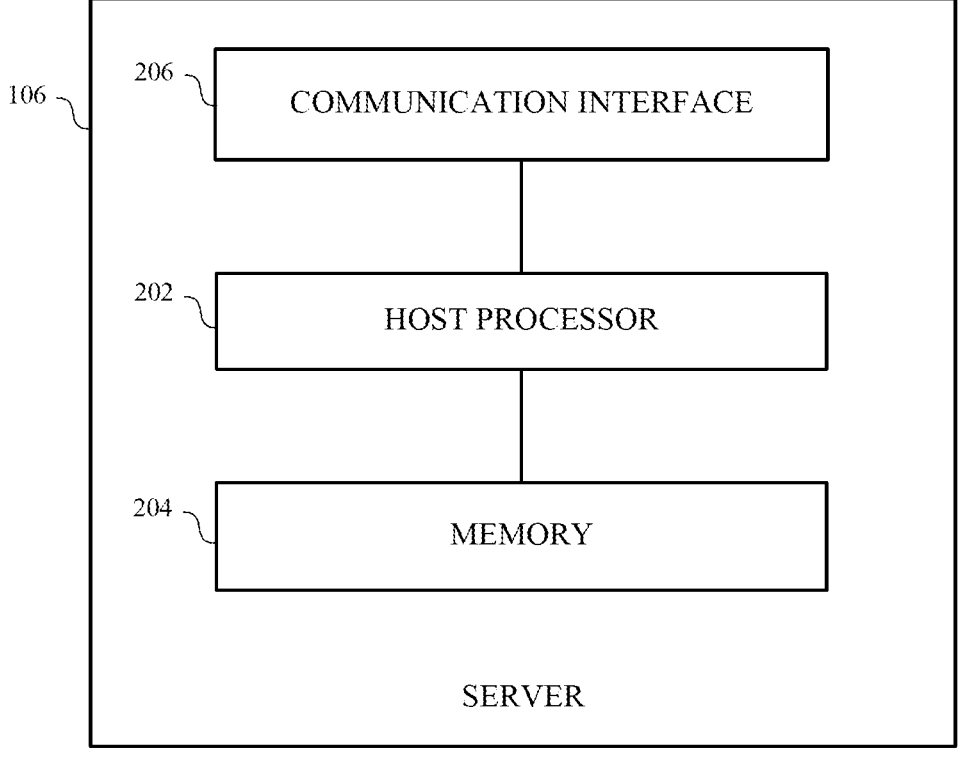
FIG. 2 depicts an example server that may implement the subject technology in accordance with one or more embodi-ments.

FIG. 2 depicts an example server that may implement the subject technology in accordance with one or more embodiments. For explanatory purposes, FIG. 2 is primarily described herein with reference to the financial service provider server 106 of FIG. 1. However, this is merely illustrative, and features of the server of FIG. 2 may be implemented by and/or in the financial institution server 104, the payment network server 108, and/or other device. Not all of the depicted components may be used in all embodiments, however, and one or more embodiments may include additional or different components than those shown in FIG. 2. Variations in the arrangement and type of the components may be made without departing from the spirit or scope of the claims as set forth herein. Additional components, different components, or fewer components may be provided.

The financial service provider server 106 that may implement the subject transaction completion prediction system may include one or more of a host processor 202, a memory 204, and/or a communication interface 206. The host processor 202 may include suitable logic, circuitry, and/or code that enable processing data and/or controlling operations of the financial service provider server 106. In this regard, the host processor 202 may be enabled to provide control signals to various other components of the financial service provider server 106. The host processor 202 may also control transfers of data between various portions of the financial service provider server 106. The host processor 202 may further implement an operating system or may otherwise execute code to manage operations of the financial service provider server 106.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage).

The communication interface 206 may include suitable logic, circuitry, and/or code that enables wired or wireless communication, such as between the electronic device 102, the financial institution server 104, the financial service provider server 106, and/or the financial service provider server 106. The communication interface 206 may include, for example, one or more of a Bluetooth communication interface, an NFC interface, a Zigbee communication interface, a WLAN communication interface, a USB communication interface, a cellular interface, or generally any communication interface.

In one or more embodiments, one or more of the host processor 202, the memory 204, the communication interface 206, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
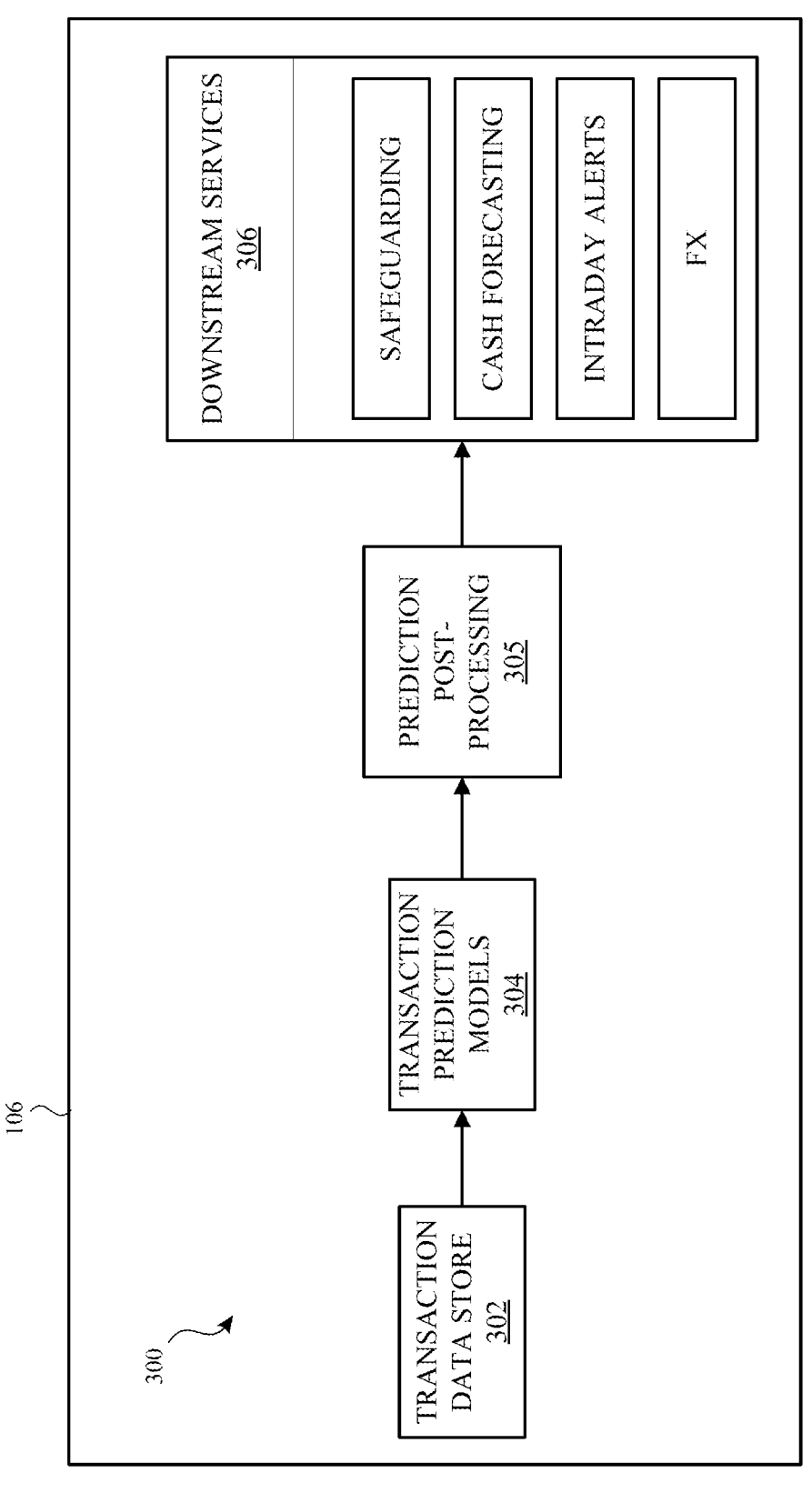
FIG. 3 depicts a diagram of an example transaction completion prediction pipeline in accordance with one or more embodiments.

FIG. 3 depicts a diagram of an example transaction completion prediction pipeline 300 in accordance with one or more embodiments. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

As discussed above, the financial service provider server 106 may receive transaction data each time a transaction (e.g., charge or payout event) occurs, and the financial service provider server 106 may store the transaction data in a transaction data store 302 of the financial service provider server 106. The financial service provider server 106 may implement a transaction completion prediction pipeline 300 that may predict a transaction completion date for each received transaction. The transaction-level data may include, for example, a transaction amount and one or more transaction attributes, such as transaction identifier, merchant identifier, currency identifier, and the like, as is discussed further below.

The transaction data store 302 may be a repository designed to store, manage, and/or facilitate the querying of transaction data. The transaction data store 302 may be implemented on a robust and scalable database management system (DBMS) that can handle high volumes of read and write operations, such as PostgreSQL, MySQL, or a NoSQL database like MongoDB, depending on the structure and use case of the data.

The transaction data store 302 may be designed with a schema optimized for transactions, which may involve tables or collections that store records of individual transactions, merchant information, user accounts, and/or the like. Each transaction record (also referred to as a "transaction-level data item") may include a transaction amount be trained on a training dataset including historical transactions, such as for a given country. Each previous transaction in the training dataset may include the data from the full timeline of each transaction, starting from clearing and ending with reconciled, i.e., confirmed, funding of the transaction.

An initial prediction may be made at the time of the clearing request for the transaction. At that time, there may be certain attributes that are known with certainty, such as the presentment currency and gateway country, but there may be attributes, such as the settlement service of a transaction, which may be inferred and/or predicted in advance. These attributes form the feature set of the training dataset used to train a machine learning model capable of predicting the settlement date of transactions. In some embodiments, the machine learning models may be built based on a corresponding card network. That is, a machine learning model may be trained for each card network, and the corresponding training dataset may have features dependent on the card network. The following table indicates with an 'x' which features may be used for a particular card network.

| | Visa | Mastercard | American Express | Discover | Cartes Bancaires | CAFIS | Elavon |
|---|---|---|---|---|---|---|---|
| Clearing request time | x | x | x | x | x | x | x |
| Clearing request day of week | x | x | x | x | x | x | x |
| Gateway country | x | x | x | x | x | x | x |
| Presentment currency | x | x | x | x | x | x | x |
| Issuer country | x | | | | | | |
| BIN | x | | | | | | |
| Processing entity | x | x | | | | | |
| Settlement service | x | | | x | | | |
| ICA | | x | | | | | |
| Clearing amount | | x | | | | | |
| Card BIN country | | x | | | | | |
| Merchant ID | | | | x | x | x | x | and attributes such as transaction ID, merchant ID, user ID, currency, timestamp, payment method, status, and/or potentially a flag indicating whether the transaction has been reconciled. Inputs to the transaction data store 302 may come from various interfaces and/or services that capture transaction events (e.g., point-of-sale systems, e-commerce platforms, and/or mobile payment applications) through secure and encrypted channels (e.g., secure file transfer protocol (SFTP)). As for outputs, the transaction data store 302 may serve as the backbone for various financial and operational processes, such as a safeguarding system and/or reporting systems (e.g., for financial reconciliation, compliance auditing, and/or analytics). The transaction data store 302 may also interface with other internal systems (e.g., fraud detection or customer service tools) enabling these systems to query transaction data in real-time or near-real-time to support business operations.

The transaction completion prediction pipeline 300 may obtain transaction data for each transaction from the transaction data store 302 and may provide the data to one or more transaction prediction models 304 for initially estimating a settlement delay. A transaction prediction model may With regard to the table above, the clearing request time may be the particular time when a transaction is submitted for clearing and the clearing request day of week may indicate the day of the week on which the clearing request is made. The gateway country may be the country where the transaction gateway, or the payment processing system, is located, which may be used for understanding the legal and operational frameworks governing the transaction, as well as the impact of any non-transfer days (e.g., holidays) in the gateway country. The presentment currency may be the currency in which a transaction is initially processed. The issuer country relates to the country where the card issuing bank is located and the bank identification number (BIN) may be the initial series of numbers on a credit or debit card that uniquely identifies the institution issuing the card.

Further with regard to the table above, the processing entity may be the organization or system (e.g., bank or card network) responsible for processing the transaction and the settlement service may refer to the specific service or protocol used by a card network (e.g., Visa or Mastercard) for the settlement of a transaction. Different settlement services can have different processing times and/or rules.

The interbank card association (ICA) Number may be a unique identifier assigned by a card network to a financial institution for identifying the institution within the network during transaction processing and settlement. The clearing amount may be the total amount of money being cleared and settled in a transaction, which can differ from the original transaction amount due to fees, currency conversion differences, or other adjustments. The card BIN country may refer to the country associated with the BIN of the card used in the transaction, which can be different from the issuer country and the merchant ID may be a unique identifier for a merchant in a payment processing system and may be used to route payments to the correct merchant account and for transaction tracking and reporting.

The above-described features that these models may be trained on may be categorized as categorical and/or continuous features, and the categorization of the features may affect how they are to be converted for use by the model. Categorical features might encompass the day of the week when the transaction was initiated, the country of the transaction gateway, and/or the presentment currency while continuous features could include the time of the clearing request, represented as the number of seconds since midnight, to capture the exact point in the transaction timeline.

The training data may be converted into a format readable by the model. Some types of training data may be treated differently than other types of data. Categorical data, such as the day of the week, currency type, and country codes, may be converted using one-hot encoding. One-hot encoding creates binary (0 or 1) columns for each category, allowing the model to process these non-numeric inputs effectively. Continuous data, such as time, may be converted into a numerical format that reflects the nature of the data. For instance, the time of a clearing request can be expressed as the number of seconds since midnight, providing a precise, quantifiable value for the model. Additionally, any missing or incomplete data may be addressed, either by filling in missing values with estimated or average values or by removing incomplete records, depending on the nature and extent of the missing data. Normalization or standardization might also be applied, particularly to continuous variables, to place data on a similar scale.

In some embodiments, for large datasets, sampling techniques may be used to reduce the volume of data to a manageable size while maintaining its representativeness. Sampling might involve stratified sampling to ensure that less common but still meaningful cases, like transactions in smaller markets or with less common currencies (e.g., RON or MYR), are adequately represented. The end result of these processes may be a clean, structured dataset optimized for machine learning, enabling the models to learn from the data effectively and make accurate predictions.

The type of model employed may be a classification model, such as XGBoost, which may be well-suited for handling the categorical nature of many of the features and the complexity of the task. The model's task may be to learn from historical data the typical settlement delay patterns associated with different combinations of the features described above. The learning may be based on the historical time elapsed from the initiation of a transaction (e.g., clearing request) to its actual settlement (e.g., transfer of funds). The model may identify patterns and correlations between the features and the observed delays, enabling it to predict the expected delay for new transactions.

The output from the model may be a classification indicating the number of days of settlement delay. The model may categorize each transaction into groups, each group representing a different delay duration (e.g., 0 business days, 1 business day, 2 business days, 3 business days, etc. up to 35 business days). For instance, consider a scenario where a business processes a credit card transaction. The model receives inputs indicating the transaction was processed on a Tuesday, in US dollars, through a US gateway, and it is a type of transaction typically settled via a standard settlement service. The model, trained on historical data, may predict a two business day settlement delay based on its training using similar past transactions. The prediction means that the model classifies this particular transaction into the "2 business day delay" category.

After determining the initial settlement delay, the prediction post processing 305 determines whether the predicted settlement period is impacted by any varying non-transfer days for the gateway country (and/or the country where the transaction will be completed). The varying non-transfer days may correspond to, for example, holidays that may differ from country to country and year to year and therefore may not be properly accounted for by the machine learning models (which may be holiday agnostic). The non-transfer days may be explicitly determined (e.g., from a holiday or calendar data feed), and/or may be inferred from historical transaction data within the relevant country, as is discussed further below with respect to FIG. 4. The prediction post processing 305 may further account for whether one or more identified non-transfer days occur on the day that the transaction was initiated, during the settlement period, or on the settlement date, as each may impact the predicted settlement delay differently as is discussed further below with respect to FIG. 5.

The prediction post processing 305 adjusts the predicted settlement delay based on any varying non-transfer days, as appropriate, and provides the predicted settlement delay to one or more downstream services 306. The downstream services 306 may use the predicted settlement delays for cash flow planning (e.g., to minimize idle funds), knowing that the funds from merchant transactions are expected to be settled and available in the appropriate accounts after the predicted settlement delays. These expected merchant cash balances may be used in various downstream services 306, such as safeguarding services, cash forecasting services, intraday alert services, and/or foreign exchange services.

In one or more implementations, safeguarding systems may help an organization meet its safeguarding obligations, which requires businesses to protect customer funds, ensuring that the funds are available and correctly allocated. Accurately predicting settlement delays helps a financial institution know when funds from card transactions will be available in its accounts. For instance, a financial institution needs to maintain a certain level of liquidity to meet its immediate obligations, including customer withdrawals or refunds. Predictive models enable the organization to plan for these liquidity requirements by providing a reliable forecast of cash inflows from settlements. Moreover, in situations where customer funds are to be held in segregated accounts, knowing the settlement times helps verify that these accounts are adequately funded in compliance with regulatory requirements.

In one or more implementations, cash forecasting (e.g., treasury management) systems may help a business keep its various bank accounts adequately solvent. Using settlement delay predictions for cash forecasting facilitates a more dynamic and efficient approach to treasury management. By automating fund transfers based on predictive insights, businesses can ensure solvency across their various accounts, optimize interest gains, and/or reduce financial risks associated with cash flow management. Cash forecasting may be particularly beneficial for businesses that experience significant variability in their transaction volumes and settlement times, allowing them to maintain financial stability and operational efficiency.

In one or more implementations, the integration of settlement delay predictions into intraday alerting systems enhances a business's ability to monitor and manage its cash flows in real time. Settlement delay predictions provide a safety net by identifying potential issues before they become problematic, allowing for timely and informed decisions to ensure financial stability and operational continuity. Intraday alerting systems may utilize predictive data to set expectations for cash inflows and outflows throughout the day, enabling timely alerts for anomalies or potential issues. For example, if a business expects a substantial settlement, such as $50,000,000 from Visa transactions, to be credited to its account by 2 p.m. based on the predictive model's output, the alerting system may track the actual fund transfer against this prediction. If 2 p.m. passes and the funds have not been received, the system may flag this discrepancy and issue an alert, indicating a potential need for manual intervention. The alert could prompt the finance team to investigate the delay, perhaps by contacting the card network or the receiving bank, to ensure that there are no underlying issues causing the delay.

In one or more implementations, foreign exchange systems may perform hedging to mitigate the risks associated with currency value fluctuations. By accurately predicting when foreign currency settlements from card transactions will occur, businesses can more effectively plan and execute their hedging strategies. A business may expect to receive payments in a foreign currency, which may be subject to settlement delays. The value of this future cash flow in terms of the business's home currency can fluctuate due to changes in exchange rates. If the settlement is delayed, the period during which the business is exposed to currency risk is extended. Settlement delay predictions enable businesses to anticipate these delays and adjust their hedging activities accordingly. For instance, if a predictive model forecasts a delay in receiving Euros from card transactions, a US-based business can adjust its currency hedging contracts to account for this delay. The business might extend the maturity of its contracts or adjust the amounts hedged to align with the new expected date of the Euro inflows, which may help the business be adequately protected against adverse movements in the EUR/USD exchange rate for the entire period until the funds are received.

Figure 4:
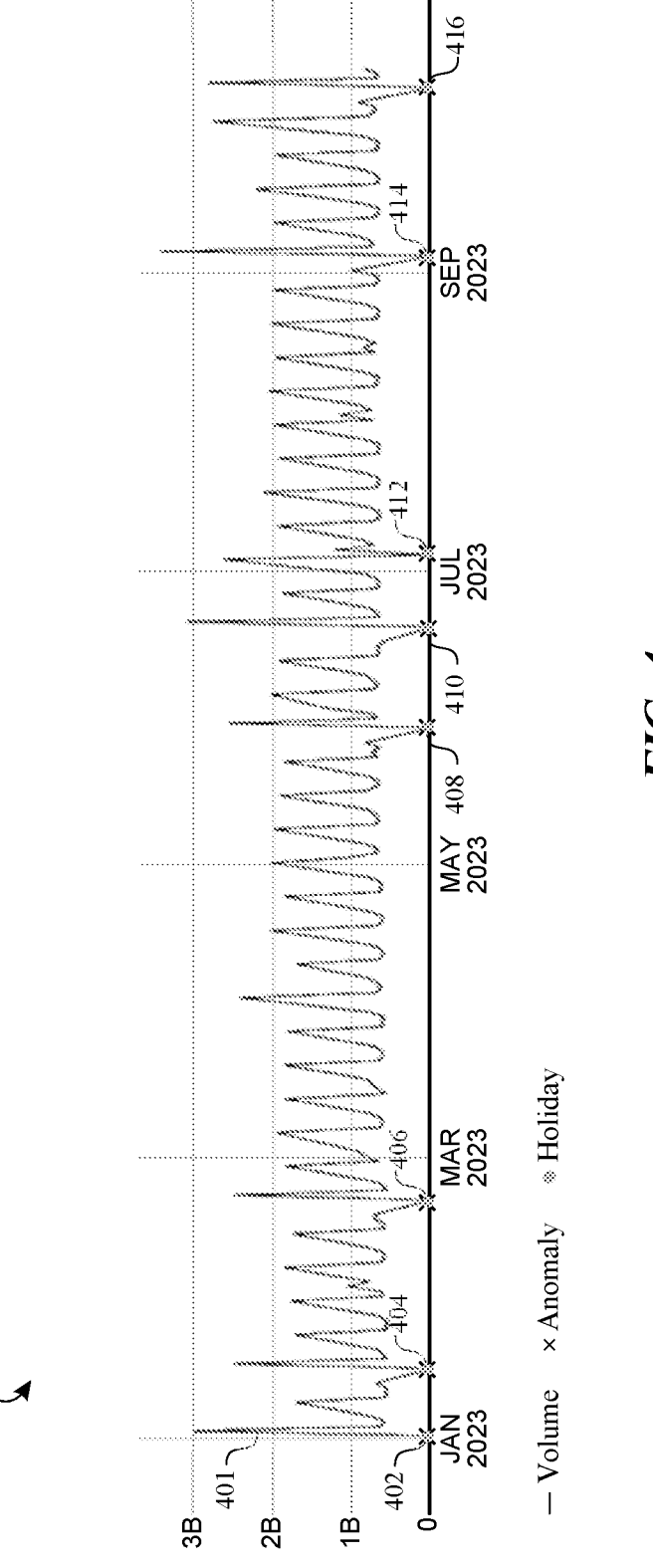
FIG. 4 depicts a diagram of an example of inferred non-transfer in accordance with one or more embodiments.

FIG. 4 depicts a diagram of an example of historical transaction volume 400 from which non-transfer days (e.g., holidays) can be inferred in accordance with one or more embodiments. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

As discussed above, a challenge in predicting settlement delays is unexpected delays in receiving funds from card networks due to non-working or non-transfer days such as holidays which may not be accounted for by the aforementioned machine learning models. The irregular and region-specific nature of holidays, coupled with their varying impact on different stages of the transaction process, makes them a complex factor to account for in predicting settlement delays. Financial institutions, including banks and card networks, may operate on a reduced schedule or close entirely during holidays, which directly impacts the time it takes for a transaction to be cleared and settled. The disruption may not be uniform because different countries and regions observe different holidays, and even within a single country, different financial institutions might observe different holidays. The variability makes it challenging to create a one-size-fits-all model for predicting settlement dates. Although discussion herein is with respect to holidays, it is contemplated that other similar non-working (e.g., days in which clearance requests are not being processed) or non-transfer (e.g., days in which settlement funds are not being transferred) days are similarly applicable.

Some holidays may be explicitly determined from a calendar, or holiday, data feed and/or from a fixed calendar; however, fixed calendars and/or calendar or holiday data feeds may not accurately account for all non-transfer days. First, holidays can vary significantly across regions and countries, meaning a fixed calendar might not accurately reflect local or regional holidays that affect specific markets. This is particularly relevant for financial service providers operating in multiple countries, where each region may have its own unique set of holidays. Additionally, not all holidays are fixed and some vary annually. For example, holidays based on lunar calendars, like Easter or Chinese New Year, change dates each year. Moreover, the way holidays impact financial transactions can also vary. In some countries or regions, a holiday might completely halt financial processing, while in others, it might only cause minor delays. Furthermore, unexpected or last-minute holidays, such as those declared for special events or in response to emergencies, may not be captured on a fixed calendar. Lastly, the fixed calendar or the calendar/holiday data feeds may occasionally have inaccuracies that would need to be identified and accounted for.

The subject technology applies post processing (e.g., the prediction post processing 305 of FIG. 3) to the predictions from the transaction prediction models 304 to provide a more adaptive approach to managing settlement predictions and account for the unpredictability of holiday-based delays without relying solely on fixed calendars and/or calendar/holiday data feeds. Understanding which bank holidays apply may be based on inferring applicable bank holidays based on historical settlement data. The system may combine empirical observation of transaction volumes with a reference to a global holiday calendar. As shown in FIG. 4, inferring non-transfer days may involve detecting bank holidays by observing anomalies in settlement volumes. Bank holidays are typically characterized by reduced or no financial activity, which translates into significantly lower volumes of transaction settlements on these days. By analyzing transaction data, days with anomalously low settlement volumes, such as those indicated by the points 402, 404, 406, 408, 410, 412, 414, and 416, can be identified. These are days when the volume of settled transactions is noticeably less (e.g., a threshold amount less) than what is typical (e.g., a running average), which may indicate that financial institutions were not operating normally, such as due to a bank holiday.

Once these inferred holidays are identified, the next step may be to match them with a holiday calendar, such as one provided by a third-party data provider. The holiday calendar may include detailed information about holidays across different countries and regions. By comparing the dates of low settlement volumes with the dates on the global calendar, the low-volume days may be cross-referenced with actual bank holidays to build a specific banking holiday schedule for each market or segment (also referred to as a slice of settlement volume or slice of transactions). Additionally, the holiday calendar allows for the determination of holidays across years. For example, the holiday calendar allows for the linking of this year's observance of Presidents Day to the observance of the Presidents Day of the following year. And so, based on the anomalies in settlement volume from past years, relevant future holidays may be extrapolated for applying to a particular slice of transactions (e.g., corresponding to the analyzed settlement volume) even when the date of the holiday changes from year to year.

However, not all holidays affect all transactions equally. To refine the analysis and make it more relevant for a particular transaction, the method considers only those holidays that are associated with specific aspects of the transaction. These aspects may include the gateway country (e.g., where the transaction is processed), the presentment currency (e.g., the currency in which the transaction is made), the settlement currency (e.g., the currency in which the settlement is received), and/or the country associated with the card network (e.g., Visa or Mastercard) involved in the transaction. By focusing on the relevant holidays, the inference approach helps improve the accuracy and specificity of the predicted impact on settlement times.

In the example depicted in FIG. 4, the diagram 400 represents a time series of historical settlement volumes with anomalies and corresponding holidays from January 2023 to October 2023. The line 401 may represent example historical settlement volume from a card network in units of millions of US dollars (USD) in a particular market segment that is likely to recognize the same holidays (e.g., a particular state in the USA). The line 401 demonstrates that settlement volume is fairly regular throughout the year, with settlement volumes occasionally dipping below 15 million USD at points 402-416.

The points 402-416 may be identified as having abnormal settlement volumes based on the settlement volume dipping below a threshold (e.g., 15 million USD), which may be pre-determined or based on running calculation (e.g., below the bottom quartile of the past 12 months), and/or below a threshold percentage of an average (e.g., 10% below a running average from the past 12 months or a year-to-date average). The points 402-416 may be determined to be relevant banking holidays by cross-referencing the dates of the points 402-416 to a holiday calendar (e.g., sourced from a third-party). With the relevant banking holidays identified for this segment, the holiday calendar may be used to identify dates of future holidays that are relevant to this segment. For example, having observed Labor Day this year for the USD segment of settlement volume, the system can extrapolate to determine that future instances of this holiday, like September 2 of the subsequent year, will apply.

Accordingly, the subject system can advantageously infer non-transfer days (e.g., holidays) from historical transaction volume and account for such days in the predicted settlement delay. However, since a non-transfer day may impact the predicted settlement delay differently depending on when within the predicted settlement period the non-transfer day occurs, the subject system further accounts for this as is discussed below with respect to FIG. 5.

FIG. 5 depicts a diagram of a table 500 of various non-transfer day types in accordance with one or more embodiments. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

As discussed above, the subject system may determine (e.g., infer) non-transfer days that are not accounted for by the transaction prediction models 304. When a non-transfer day occurs within a predicted settlement period, the subject system then determines the impact of the non-transfer day on the settlement. There may be three types of non-transfer days (e.g., holidays): central processing date (CPD) non-transfer days, intervening non-transfer days, and settlement date non-transfer days, each with distinct impacts on the settlement process.

A CPD may be the day on which a card transaction is processed by a card network, which may include authorization, clearing, and/or settlement. The CPD may mark the start of the clearing process, setting in motion the series of steps that will eventually lead to the settlement of the transaction. Transactions processed before a certain daily cutoff time may be processed on the same day, while those after the cutoff may be processed the next business day. CPD non-transfer days are those that fall on the day a transaction is processed. If a non-transfer day occurs on a CPD, the start of the settlement process may be delayed, pushing the entire settlement timeline back. This may particularly be the case if the clearing request is submitted before the daily cutoff time, in which case the settlement delay may be extended one day either by adding a day to the predicted settlement delay or changing the clearing request date to the following day (e.g., as if the request were submitted after the cutoff time). If the transaction is submitted after the cutoff, the transaction may be processed the next business day, making the CPD non-transfer day's impact (if any) less direct. As shown in FIG. 5, assuming Tuesday is a non-transfer day, Tuesday is a CPD non-transfer day for transaction A because the CPD is Tuesday.

The remaining two non-transfer day types, intervening and settlement date non-transfer days, apply based on the card network being utilized. Intervening non-transfer days occur in the period between the CPD and expected settlement date. Intervening non-transfer day can extend the settlement period, as financial institutions may be closed, slowing the progression of transactions toward settlement. As shown in FIG. 5, assuming Tuesday is a non-transfer day, Tuesday is an intervening non-transfer day for transaction B because the CPD is Monday and the expected settlement date is Wednesday.

Settlement date non-transfer days are those that fall on the expected settlement date. Settlements do not typically occur on settlement date non-transfer days, leading to a delay until the next business day. As shown in FIG. 5, assuming Tuesday is a non-transfer day, Tuesday is a settlement date non-transfer day for transaction C because the CPD is Monday and the expected settlement date is Tuesday.

To accurately predict the impact of intervening and settlement date non-transfer days, a baseline of settlement times may be computed for different transaction volumes (e.g., slices of transaction volume). The baseline may reflect the expected settlement delay under normal conditions (e.g., when no cutoff has been reached and thus without the influence of non-transfer days) and serves as a reference point against which delays can be measured. If the settlement delay prediction is longer than the baseline delay, then the start of the transaction may be shifted by one business day.

FIG. 6 depicts a flow diagram of an example process 600 for predicting transaction completion in accordance with one or more embodiments. For explanatory purposes, the process 600 is primarily described herein with reference to the electronic device 102, the financial institution server 104, the financial service provider server 106, and the payment network server 108 of FIG. 1. However, the process 600 is not limited to the electronic device 102, the financial institution server 104, the financial service provider server 106, and the payment network server 108, and one or more blocks of the process 600 may be performed by one or more other by other suitable devices. Further, for explanatory purposes, the blocks of the process 600 are described herein as occurring sequentially or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 may be used by a financial service provider server 106 to predict the amount of delay that may take place before a transaction settles, as described above with respect to FIG. 3. The process 600 may include inferring non-transfer days (e.g., holidays) to determine the impact of non-transfer days on the predicted settlement delay, as described above with respect to FIG. 4. The process 600 may determine how different types of non-transfer days impact the predicted settlement delay, as described above with respect to FIG. 5.

At block 602, a server (e.g., the financial service provider server 106) may generate, receive, access, or otherwise obtain a transfer request event (e.g., a clearing request). The transfer request event may be associated with a transaction (e.g., a credit card transaction) and may correspond to a day of the week (e.g., Monday through Friday) and a time of day (e.g., business hours, such as 9 a.m. to 5 p.m.).

For example, in the context of card transaction processing, the transaction data is stored in the financial service provider server after the transaction details are authorized by the card issuer. The financial service provider server may then aggregate authorized transactions over a certain period, such as at the end of the business day, and generate a clearing request, including information associated with the aggregated authorized transactions. The clearing request may be sent to the card network (e.g., payment network server 108) notifying the card network that the transactions are ready to be processed for transfer (e.g., settlement).

At block 604, the server may first determine the request time of day. The request time may then be compared with the predefined cutoff time. The cutoff time may be a specific time of day by which transactions must be processed for them to be considered for transfer (e.g., settlement) on the same day, such as in a given jurisdiction or country. If the request time is found to be past the cutoff, the transaction will not be processed until the following business day. Consequently, the server may adjust the 'request day of week' parameter of the transaction (e.g., for purposes of predicting the settlement delay) to reflect this delay (e.g., to the next business day that is not a non-transfer day), which may also similarly impact the expected transfer date (e.g., settlement date). For instance, if a transaction is submitted on a Friday evening past the cutoff time, the processing may not begin until Monday, assuming Saturday and Sunday are non-transfer days. Therefore, the server may adjust the request day from Friday to Monday. This adjustment improves the accuracy of predicting the transfer date since it aligns the transaction's processing timeline with the actual operational days of financial institutions and card networks.

At block 606, as the transfer request is obtained or afterward, the server may determine a predicted transfer delay for one or more of the transactions included with the transfer request event. For purposes of discussion of process 600, only a single transaction will be discussed.

The determination of the predicted transfer delay may be initially made using a machine learning model trained on historical transaction data. For example, the server may collect and/or preprocess data related to past transactions to form a training dataset. The training dataset may include various attributes of each transaction, such as the date and time of the transaction, the type and location of the merchant, the currency used, the card network involved (e.g., Visa, Mastercard, etc.), and/or the actual time taken for previous transfers (e.g., settlements). The preprocessing step may involve cleaning the data, handling missing values, encoding categorical variables (e.g., converting days of the week into a machine-readable format), and/or normalizing numerical inputs. Next, the training dataset may be used to train a machine learning model. The model may be, and/or may include, for example, a regression model, a decision tree, a neural network, a classifier, one or more random forests, one or more gradient boosting machines (e.g., XGBoost), and/or the like. The model may be trained to identify patterns in the historical data that correlate with the transfer delay (e.g., settlement delay). For instance, the model may learn that transactions processed late in the day, on certain days of the week, or involving particular currencies and/or card networks typically experience longer transfer delays.

The trained machine learning model may receive at least part of the transfer request event as input, and the output of the trained machine learning model may be a classification representing the number of days (e.g., business days) of transfer delay. Another possible output could be a regression value that predicts the exact number of hours or days until transfer (e.g., settlement). Additionally, some examples might output probability distributions for different delay durations. For instance, a model could predict a 70% chance of a 1-day delay, a 20% chance of a 2-day delay, and a 10% chance of a 3-day delay.

At block 608, the server (e.g., the financial service provider server 106) may generate, receive, access, or otherwise obtain a set of relevant non-transfer days (e.g., non-processing days and/or holidays) based at least in part on a comparison between the historical transaction data and a set of past non-transfer days. For example, the set of relevant non-transfer days may correspond to non-transfer days for the country and/or jurisdiction corresponding to the transaction. In one or more implementations, the non-transfer days for the country may be pre-determined based at least in part on the comparison between the historical transaction data and the set of past non-transfer days, and the pre-determined set of relevant non-transfer days may then be retrieved by the server at block 608.

For example, historical transaction data for the country may include the dates and/or amount (e.g., number and/or volume) of transactions processed in the country (e.g., settled and/or reconciled) over a pre-determined period (e.g., 12 months). As discussed above, patterns or anomalies may be identified in the historical transaction data that may be associated with reduced transaction activity, which may occur during non-transfer days when banks and financial institutions are closed. Patterns or anomalies may be identified based on various methods, including threshold-based identification, percentage deviations from an average, or more complex statistical models. Threshold-based identification may involve setting volume thresholds, and any transfer volume (settlement volume) falling below this pre-defined level may be flagged as an anomaly. Percentage deviations from an average may offer a more dynamic approach. In this method, the average transfer volume (e.g., calculated over a 12-month period) may be used as a baseline. Transfer volumes that deviate from the average by a pre-determined percentage may be considered anomalies. The pre-determined percentage may be based on historical data and may be adjusted to account for known variations, such as those due to seasonal trends or market changes. Other methods such as statistical models (e.g., time series analysis) or machine learning algorithms can also be employed.

In some embodiments, the set of past non-transfer days may be filtered to reduce the number of non-transfer days considered and improve the efficiency of the identification of relevant non-transfer days. The set of past non-transfer days may be filtered by attributes such as the country associated with the transactions, a presentment currency associated with the transactions, and/or a target currency associated with the transactions.

Once potential patterns and/or anomalies are identified, the system may, in one or more implementations, cross-reference them with a set of past non-transfer days (e.g., a calendar of past holidays). By comparing the dates of low transaction activity with the dates on the holiday calendar, the server can determine which non-transfer days of the set of past non-transfer days are relevant (e.g., due to the anomalous transfer volume). This comparison helps in iden-tifying not just the obvious national or public holidays, but also less apparent or region-specific holidays that might affect transaction processing. For instance, analyzing the anomalies of a slice of transfer volume associated with a particular region may be used to identify holidays that affect the region that may not affect other regions, and the analysis may be performed for one or more other regions to identify holidays relevant to the respective regions.

By understanding the impact of past non-transfer days on transaction amounts and how these non-transfer days are scheduled to recur (e.g., based on non-transfer day calen-dars), the server can anticipate similar impacts in the future. Once relevant non-transfer days are identified, the next step may be to project these findings into the future. Projecting into the future may involve examining the patterns of how the identified non-transfer days occur—some non-transfer days happen on fixed dates every year (e.g., New Year's Day on January 1$^{st}$), while others might be floating holidays whose date changes each year (e.g., Easter). For fixed non-transfer days, future dates can be predicted with cer-tainty (e.g., by reference to a non-transfer day calendar). For floating holidays, future dates may be estimated based on the rules or patterns governing their occurrence (e.g., the first Monday of a particular month). In addition to these pattern-based projections, the analysis may also consider any changes or trends in holiday observances, which may involve monitoring announcements from official sources or incorporating data from non-transfer day calendars that project future dates based on historical trends and current information.

At block 610, the server may determine whether any non-transfer days from the set of relevant non-transfer days occur within the predicted transfer delay (e.g., between the request day of week and the end of the predicted transfer day). If there are non-transfer days that occur within the predicted transfer delay, the server may adjust the predicted transfer delay based on the non-transfer days that occur within the predicted transfer delay. For example, the pre-dicted transfer delay may be extended by one business day for each non-transfer day that occurs within the predicted transfer delay.

The adjustment to the predicted settlement delay may depend on when in the delay period (e.g., the period from the clearing request date to the end of the predicted settlement delay) the non-transfer day falls, as different types of non-transfer days may impact the settlement process differently. If a non-transfer day occurs on the central processing date (CPD) of a transaction, the non-transfer day could delay the start of the settlement process, causing the clearing request date to effectively be the subsequent day. This is similarly the case if the clearing request occurs before the daily cutoff time on the day preceding the non-transfer day, leading to a postponement of processing until the next business day. Intervening non-transfer days, or those that fall between the CPD and the expected settlement date, can extend the settlement period. Financial institutions such as banks and card networks typically do not process transactions on non-transfer days, so each intervening non-transfer day could add an extra day of settlement delay. Finally, a non-transfer day that falls on the expected settlement date itself (i.e., a settlement date non-transfer day) may mean that settlement cannot occur on that day, as banks and other financial institutions are closed, which may push the settle-ment to the next business day.

At block 612, the server may transmit, store, upload, or otherwise provide the predicted transfer delay to one or more downstream services, such as safeguarding systems, cash forecasting (treasury management) systems, intraday alerting systems, and/or foreign exchange hedging systems. One or more downstream services may modify, update, replace, or otherwise augment one or more transaction-level data items (e.g., from the transaction data store 302) asso-ciated with the transaction. For example, a 'settlement date' attribute may be blank in a transaction for which a transfer (e.g., settlement) from a card network has yet to occur, and treasury management may use the predicted settlement delay as a placeholder in the transaction-level data items corre-sponding to the transaction for determining whether certain bank accounts are adequately funded.

In some embodiments, the machine learning model may be re-trained based on reconciliation data. The remote server may receive reconciliation data associated with the transac-tion from a remote server (e.g., payment network server 108). For one or more transactions, the server may deter-mine a difference between the predicted transfer delay and the actual transfer delay as indicated by the reconciliation data, and then the server may re-train the machine learning model based on the determined difference.

Figure 7:
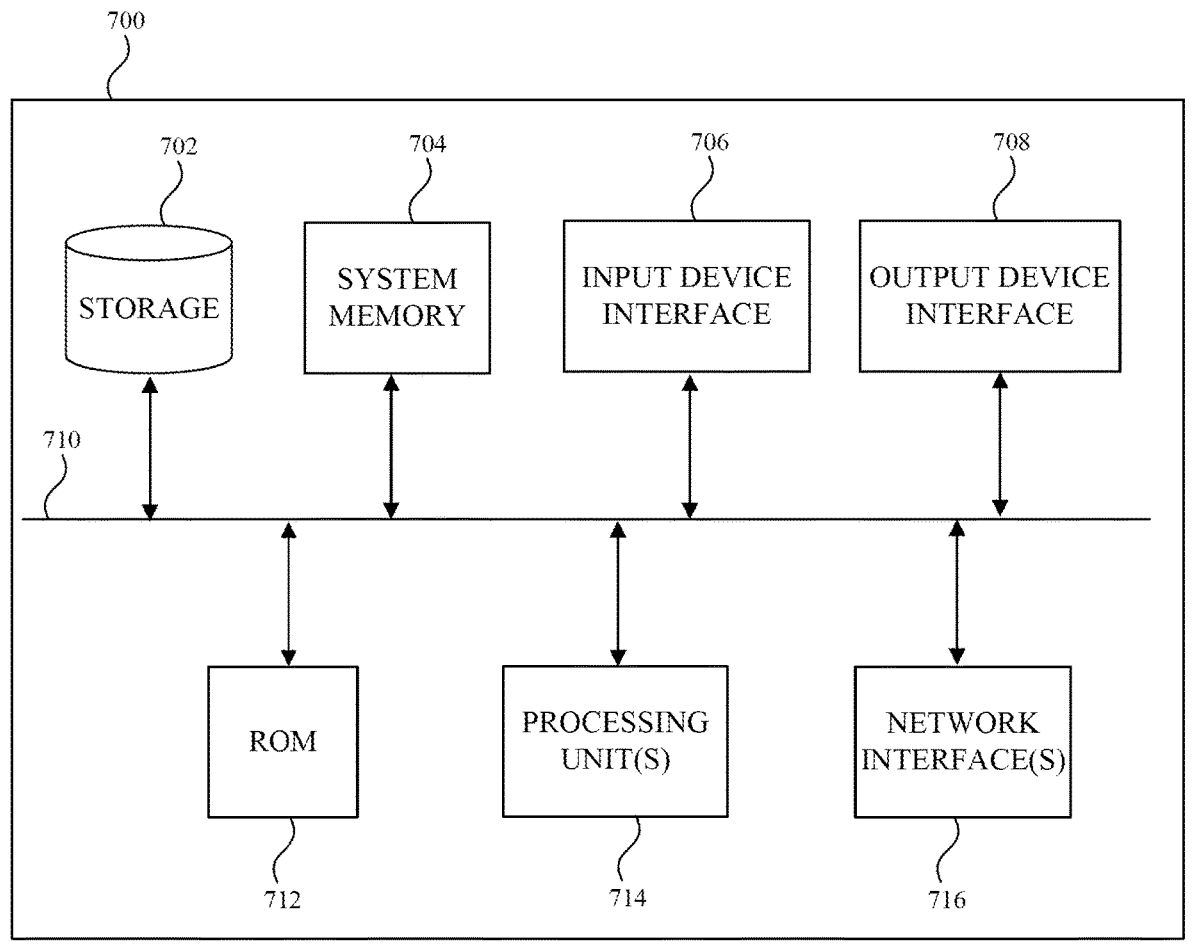
FIG. 7 depicts an example electronic system with which aspects of the present disclosure may be implemented, in accordance with one or more embodiments.

FIG. 7 depicts an example electronic system 700 with which aspects of the present disclosure may be imple-mented, in accordance with one or more embodiments. The electronic system 700 can be, and/or can be a part of, any electronic device for generating the features and processes described in reference to FIGS. 1-6, including but not limited to a laptop computer, tablet computer, smartphone, and/or wearable device (e.g., smartwatch, fitness band). The electronic system 700 may include various types of com-puter-readable media and interfaces for various other types of computer-readable media. The electronic system 700 includes one or more processing unit(s) 714, a persistent storage device 702, a system memory 704 (and/or buffer), an input device interface 706, an output device interface 708, a bus 710, a ROM 712, one or more processing unit(s) 714, one or more network interface(s) 716, and/or subsets and variations thereof.

The bus 710 collectively represents all system, peripheral, and/or chipset buses that communicatively connect the numerous internal devices of the electronic system 700. In one or more embodiments, the bus 710 communicatively connects the one or more processing unit(s) 714 with the ROM 712, the system memory 704, and the persistent storage device 702. From these various memory units, the one or more processing unit(s) 714 retrieves instructions to execute and data to process in order to execute the processes of the subject disclosure. The one or more processing unit(s) 714 can be a single processor or a multi-core processor in different embodiments.

The ROM 712 stores static data and instructions that are needed by the one or more processing unit(s) 714 and other modules of the electronic system 700. The persistent storage device 702, on the other hand, may be a read-and-write memory device. The persistent storage device 702 may be a non-volatile memory unit that stores instructions and data even when the electronic system 700 is off. In one or more embodiments, a mass-storage device (such as a magnetic or optical disk and its corresponding disk drive) may be used as the persistent storage device 702.

In one or more embodiments, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 714 may need at runtime. In one or more embodiments, the processes of the subject disclosure are stored in the system memory 704, the persistent storage device 702, and/or the ROM 712. From these various memory units, the one or more processing unit(s) 714 retrieves instructions to execute and data to process in order to execute the processes of one or more embodiments.

The bus 710 also connects to the input device interfaces 706 and output device interfaces 708. The input device interface 706 enables a user to communicate information and select commands to the electronic system 700. Input devices that may be used with the input device interface 706 may include, for example, alphanumeric keyboards, touch screens, and pointing devices. The output device interface 708 may enable the electronic system 700 to communicate information to users. For example, the output device interface 708 may provide the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more embodiments may include devices that function as both input and output devices, such as a touchscreen. In these embodiments, feedback provided to the user can be any form of sensory feedback, such as visual feedback, auditory feedback, or tactile feedback; and input from the user can be received in any form, including acoustic, speech, or tactile input.

The bus 710 also couples the electronic system 700 to one or more networks and/or to one or more network nodes through the one or more network interface(s) 716. In this manner, the electronic system 700 can be a part of a network of computers (such as a local area network, a wide area network, an Intranet, or a network of networks, such as the Internet). Any or all components of the electronic system 700 can be used in conjunction with the subject disclosure.

Embodiments within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more embodiments, the tangible computer-readable storage medium can be directly coupled to a computing device, while in other embodiments, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be re-arranged, or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together into a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, an embodiment, the embodiment, another embodiment, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase (s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
obtaining, by a first device, details of a network event, the details for the network event indicating a day of week associated with the network event and a time of day associated with the network event;
in response to determining that the time of day associated with the network event is past a pre-determined time of day, adjusting, by the first device, the day of week to be a subsequent day of week;
determining, by the first device, using the details of the network event and based on a machine learning model trained on historical network event data, a predicted verification delay for verifying the network event by a recipient of the network event, wherein training the machine learning model comprises: preprocessing the historical network event data including non-numeric categorical data and continuous data to encode the non-numeric categorical data into encoded data and to convert the continuous data into converted numerical data, and wherein the machine learning model is trained based on the encoded data and the converted numerical data;
obtaining, by the first device, a set of relevant non-verification days for the network event based at least in part on a comparison between the historical network event data and a set of past non-verification days, wherein the set of relevant non-verification days correspond to days on which verifying the network event
by the recipient cannot occur;

in response to determining that one or more non-verifi-
cation days from the set of relevant non-verification
days occur within a time period from the day of week
and over the predicted verification delay, by the first
device, increasing the predicted verification delay
based on the one or more non-verification days;

providing, by the first device, the predicted verification
delay to one or more downstream services for perform-
ing a planned operation based on an estimated verifi-
cation delay, the predicted verification delay corre-
sponding to the estimated verification delay, wherein
the downstream services are configured to perform
processing resource planning based on the estimated
verification delay, thereby resulting in a reduction of
processing resource utilization upon verification of the
network event; and when an actual verification delay extends beyond the
predicted verification delay, flagging, by the first
device, the network event and triggering an alert for
intervention.

2. The method of claim 1, further comprising, prior to
determining the predicted verification delay:

determining a baseline verification delay for the network
event based on a segment of the historical network
event data; and in response to the predicted verification delay being
greater than the baseline verification delay, adjusting
the day of week of the network event to a next day that
is not a non-verification day.

3. The method of claim 1, wherein increasing the pre-
dicted verification delay comprises:

in response to the one or more non-verification days
coinciding with the predicted verification delay,
increasing the predicted verification delay by one day.

4. The method of claim 1, wherein increasing the pre-
dicted verification delay based on the one or more non-
verification days comprises extending the predicted verifi-
cation delay by one day for each of the one or more
non-verification days.

5. The method of claim 1, further comprising updating
one or more attributes of the network event based on the
predicted verification delay.

6. The method of claim 1, further comprising:

receiving, from a remote server, reconciliation data asso-
ciated with the network event;

determining a difference between the predicted verifica-
tion delay and the actual verification delay indicated by
the reconciliation data; and re-training the machine learning model based on the
difference.

7. The method of claim 1, wherein obtaining the set of
relevant non-verification days comprises filtering the set of
past non-verification days by at least a country associated
with the network event.

8. The method of claim 1, wherein the set of past
non-verification days includes past holidays.

9. The method of claim 1, wherein the one or more
downstream services comprise at least one of a safeguarding
service, a resource management service, an intraday alerting
service, or a foreign resource service.

10. The method of claim 1, wherein the historical network
event data includes a subset of available historical network
event data, wherein the historical network event data is
sampled from the available historical network event data in a stratified manner to ensure the historical network event
data is representative of the available historical network
event data.

11. An electronic device comprising:

a memory; and a processor configured to:

obtain details of a network event, the details for the
network event indicating a day of week associated
with the network event and a time of day associated
with the network event;

in response to determining that the time of day asso-
ciated with the network event is past a pre-deter-
mined time of day, adjusting the day of week to be
a subsequent day of week;

determine, using the details of the network event and
based on a machine learning model trained on his-
torical network event data, a predicted verification
delay for verifying the network event by a recipient
of the network event, wherein training the machine
learning model comprises: preprocessing the histori-
cal network event data including non-numeric cat-
egorical data and continuous data to encode the
non-numeric categorical data into encoded data and
to convert the continuous data into converted
numerical data, and wherein the machine learning
model is trained based on the encoded data and the
converted numerical data;

obtain a set of relevant non-verification days for the
network event based at least in part on a comparison
between the historical network event data and a set
of past non-verification days, wherein the set of
relevant non-verification days correspond to days on
which verifying the network event by the recipient
cannot occur;

in response to determining that one or more non-
verification days from the set of relevant non-veri-
fication days occur within a time period from the day
of week and over the predicted verification delay,
increase the predicted verification delay based on the
one or more non-verification days;

provide the predicted verification delay to one or more
downstream services for performing a planned
operation based on an estimated verification delay,
the predicted verification delay corresponding to the
estimated verification delay, wherein the down-
stream services are configured to perform processing
resource planning based on the estimated verification
delay, thereby resulting in a reduction of processing
resource utilization upon verification of the network
event; and when an actual verification delay extends beyond the
predicted verification delay, flagging the network
event and triggering an alert for intervention.

12. The electronic device of claim 11, wherein the pro-
cessor is further configured to, prior to determination of the
predicted verification delay:

determine a baseline verification delay for the network
event based on a segment of the historical network
event data; and in response to the predicted verification delay being
greater than the baseline verification delay, adjust the
day of week of the network event to a next day that is
not a non-verification day.

13. The electronic device of claim 11, wherein the pro-
cessor is configured to increase the predicted verification
delay by:

in response to the one or more non-verification days coinciding with the predicted verification delay, increase the predicted verification delay by one day.

14. The electronic device of claim 11, wherein the processor is configured to increase the predicted verification delay based on the one or more non-verification days by extending the predicted verification delay by one day.

15. The electronic device of claim 11, wherein the processor is further configured to update one or more attributes of the network event based on the predicted verification delay.

16. The electronic device of claim 11, wherein the processor is further configured to:

receive, from a remote server, reconciliation data associated with the network event;

determine a difference between the predicted verification delay and the actual verification delay indicated by the reconciliation data; and re-train the machine learning model based on the difference.

17. The electronic device of claim 11, wherein the processor is configured to obtain the set of relevant non-verification days by filtering the set of past non-verification days by at least a country associated with the network event.

18. The electronic device of claim 11, wherein the set of past non-verification days includes past holidays.

19. The electronic device of claim 11, wherein the one or more downstream services comprise at least one of a safeguarding service, a resource management service, an intra-day alerting service, or a foreign resource service.

20. A non-transitory computer-readable medium comprising:

computer-readable instructions that, when executed by a processor, cause the processor to perform one or more operations comprising:

obtaining details of a network event, the details for the network event indicating a day of week associated with the network event and a time of day associated with the network event;

in response to determining that the time of day associated with the network event is past a pre-determined time of day, adjusting the day of week to be a subsequent day of week;

determining, using the details of the network event and based on a machine learning model trained on historical network event data, a predicted verification delay for verifying the network event by a recipient of the network event, wherein training the machine learning model comprises: preprocessing the historical network event data including non-numeric categorical data and continuous data to encode the non-numeric categorical data into encoded data and to convert the continuous data into converted numerical data, and wherein the machine learning model is trained based on the encoded data and the converted numerical data;

obtaining a set of relevant non-verification days for the network event based at least in part on a comparison between the historical network event data and a set of past non-verification days, wherein the set of relevant non-verification days correspond to days on which verifying the network event by the recipient cannot occur;

in response to determining that one or more non-verification days from the set of relevant non-verification days occur within a time period from the day of week and over the predicted verification delay, increasing the predicted verification delay based on the one or more non-verification days; and providing the predicted verification delay to one or more downstream services for performing a planned operation based on an estimated verification delay, the predicted verification delay corresponding to the estimated verification delay, wherein the downstream services are configured to perform processing resource planning based on the estimated verification delay, thereby resulting in a reduction of processing resource utilization upon verification of the network event; and when an actual verification delay extends beyond the predicted verification delay, flagging the network event and triggering an alert for intervention.

* * * * *